United States Patent
Fleming et al.

(10) Patent No.: US 8,099,524 B2
(45) Date of Patent: Jan. 17, 2012

(54) AUTOMATED METHOD TO CONFIGURE A DATA STORAGE SYSTEM

(75) Inventors: Mark Sean Fleming, Oro Valley, AZ (US); Lisa R. Martinez, Tucson, AZ (US); Lu Nguyen, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 12/243,754

(22) Filed: Oct. 1, 2008

(65) Prior Publication Data

US 2010/0082933 A1  Apr. 1, 2010

(51) Int. Cl.
*G06F 3/00* (2006.01)
*G06F 9/00* (2006.01)

(52) U.S. Cl. .............. 710/8; 713/1; 713/2; 719/325; 719/326; 719/327

(58) Field of Classification Search .............. None
See application file for complete search history.

(56) References Cited

U.S. PATENT DOCUMENTS

| | | | |
|---|---|---|---|
| 2003/0074527 A1* | 4/2003 | Burton et al. | 711/114 |
| 2004/0103220 A1 | 5/2004 | Bostick et al. | |
| 2005/0050191 A1 | 3/2005 | Hubis | |
| 2005/0055428 A1 | 3/2005 | Terai et al. | |
| 2005/0144384 A1 | 6/2005 | Eguchi et al. | |
| 2006/0031508 A1 | 2/2006 | Gellai et al. | |
| 2006/0085522 A1* | 4/2006 | Spry | 709/220 |
| 2006/0112173 A1* | 5/2006 | Cohn et al. | 709/220 |
| 2009/0282135 A1* | 11/2009 | Ravindran et al. | 709/222 |

* cited by examiner

*Primary Examiner* — Eron J Sorrell
*Assistant Examiner* — Dean Phan
(74) *Attorney, Agent, or Firm* — Dale F. Regelman; Quarles & Brady LLP

(57) ABSTRACT

An automated, computer-implemented method to configure a data storage system comprising a host computer, a storage controller in communication with said host computer, and a plurality of data storage media in communication with said storage controller, wherein the method provides a configuration algorithm encoded as computer readable program code, and executes that computer readable program code. The configuration algorithm creates a command procedure comprising a plurality of physical configuration commands to establish a physical configuration for the data storage system. The configuration algorithm further creates a command procedure comprising a plurality of logical configuration commands to establish a logical configuration for the data storage system.

16 Claims, 5 Drawing Sheets

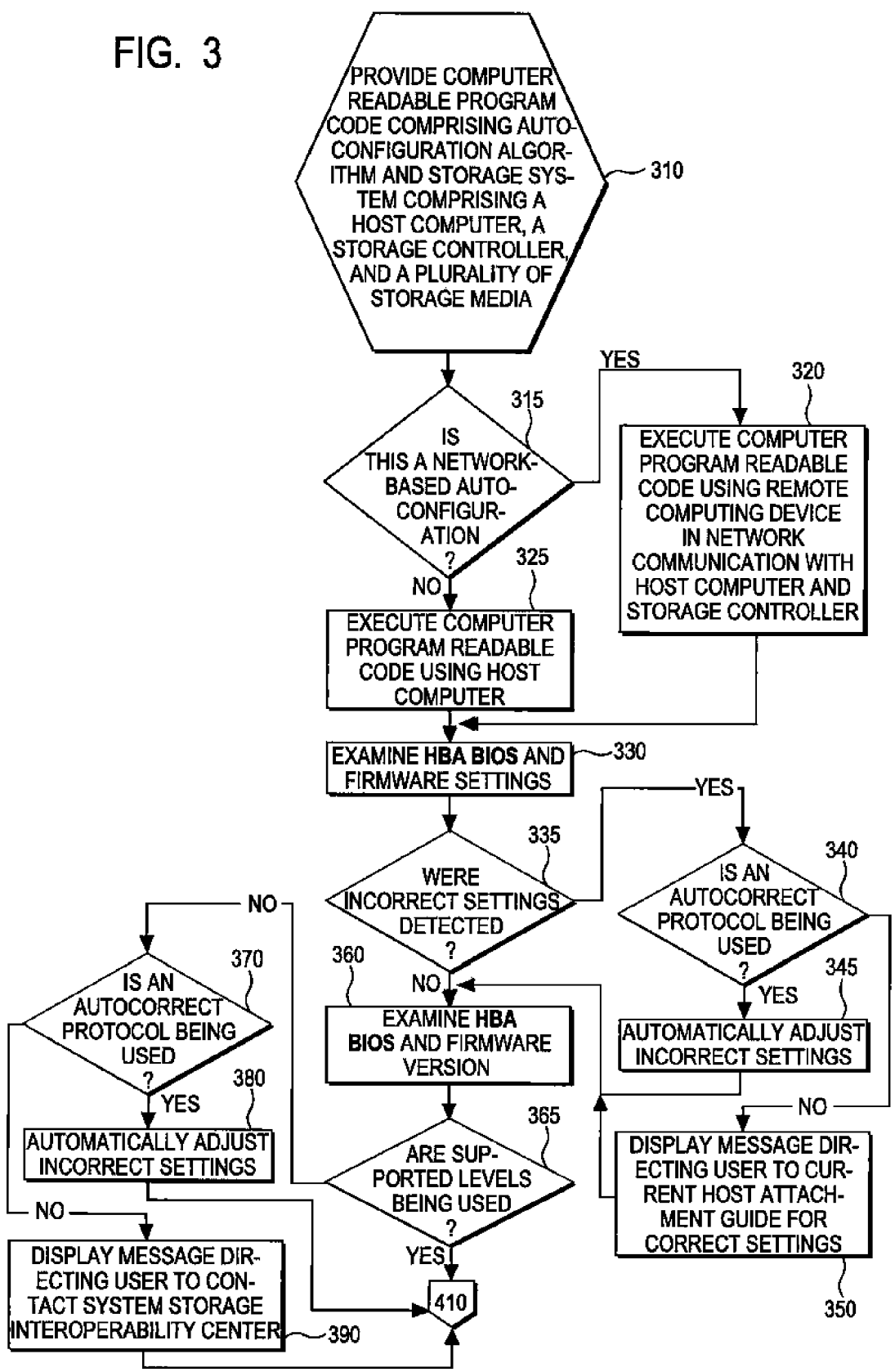

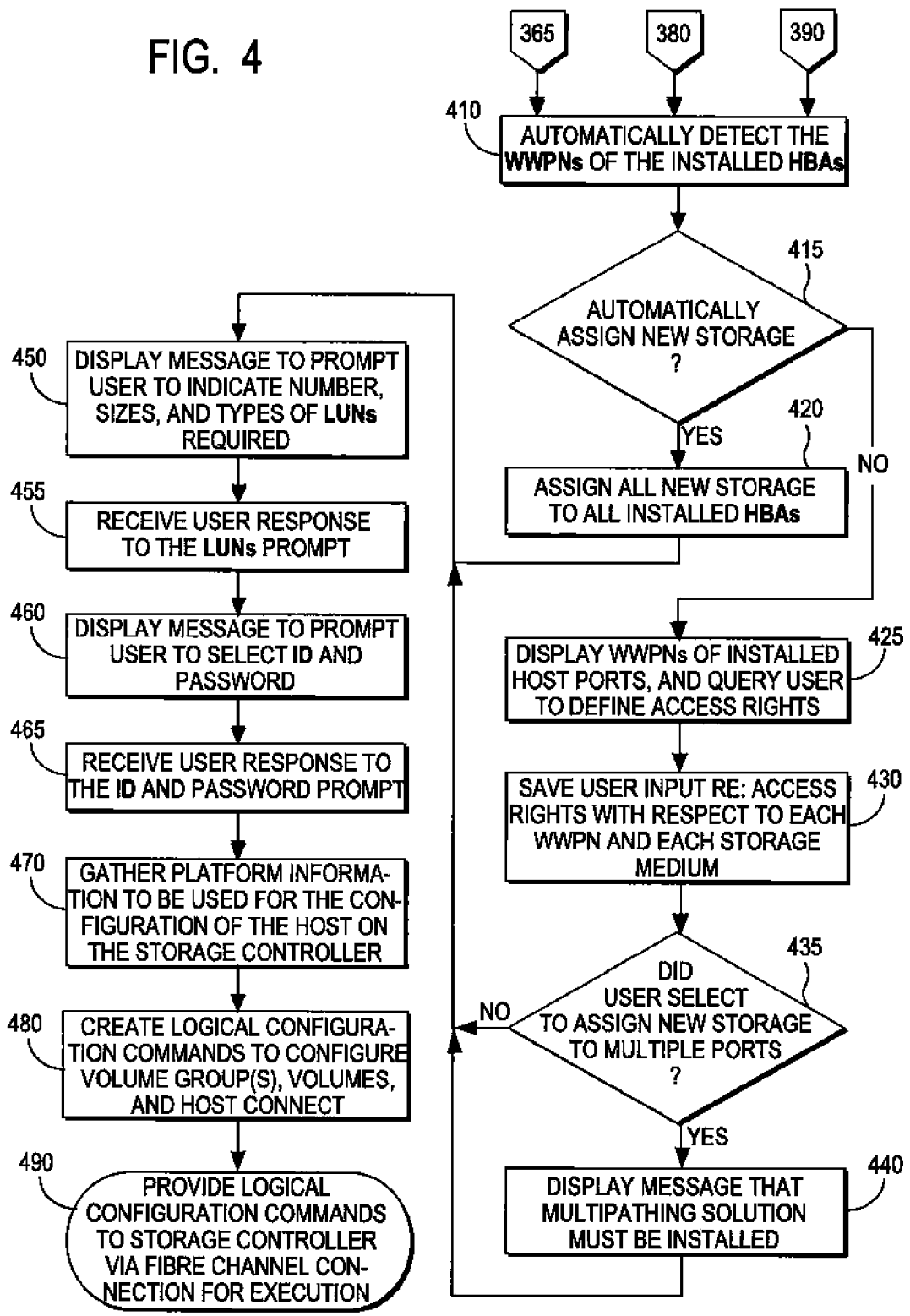

AUTOMATED METHOD TO CONFIGURE A DATA STORAGE SYSTEM

FIELD OF THE INVENTION

This invention relates to an automated method to configure a data storage system.

BACKGROUND OF THE INVENTION

It is known in the art to store information using a data storage system comprising a host computer, a storage controller in communication with the host computer, and a plurality of data storage media in communication with the storage controller. Such a data storage system comprises a plurality of physical objects, such as for example a plurality of host bus adapters, a plurality of processors, a plurality of device adapters, a plurality of storage media, a plurality of robotic accessors, and the like. Both a physical and a logical configuration must be created before the data storage system can be made operational.

Creating such a physical configuration and a logical configuration can be a time-consuming task. Using prior art methods, such physical and logical configurations are manually created by a storage administrator. Using these prior art methods, the storage administrator must either physically access, or remotely access via an ethernet link, a storage controller or a hardware management console.

SUMMARY OF THE INVENTION

The invention comprises a computer-implemented method to configure a data storage system comprising a host computer, a storage controller in communication with said host computer, and a plurality of data storage media in communication with said storage controller. The method provides a configuration algorithm encoded in a computer readable medium as computer readable program code, and executes that computer readable program code.

The configuration algorithm creates a command procedure comprising a plurality of physical configuration commands to establish a physical configuration for the data storage system. The configuration algorithm further creates a command procedure comprising a plurality of logical configuration commands to establish a logical configuration for the data storage system.

BRIEF DESCRIPTION OF THE DRAWINGS

The invention will be better understood from a reading of the following detailed description taken in conjunction with the drawings in which like reference designators are used to designate like elements, and in which:

FIG. 3 is a flow chart summarizing certain steps in Applicants' method; and

FIG. 4 is a flow chart summarizing certain additional steps in Applicants' method.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
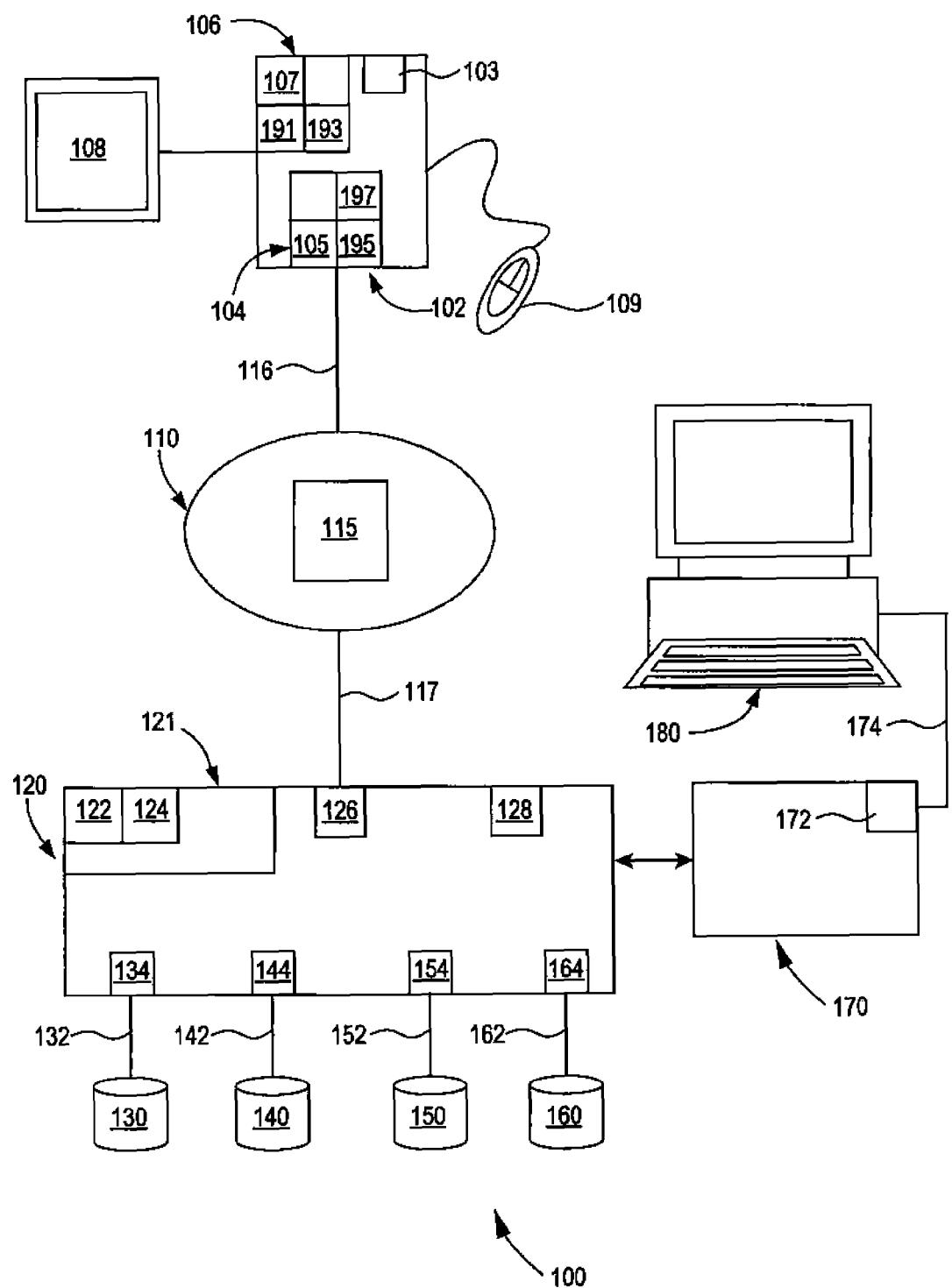
FIG. 1 is a block diagram showing a system administrator's computing device interconnected with a hardware management console in order to configure a data storage system.

In the illustrated embodiment of FIG. 1, data storage system 100 comprises host computer 102, storage controller 120, data storage media 130, 140, 150, and 160, and hardware management console 170. In certain embodiments, hardware management console is integral with storage controller 120. In certain embodiments, storage controller 120, data storage media 130, 140, 150, and 160, and hardware management console 170, are disposed in a common housing. As those skilled in the art will appreciate, in certain embodiments computing system 100 comprises a plurality of host computers in communication with storage controller 120.

In the illustrated embodiment of FIG. 1, storage controller 120 communicates with data storage media 130, 140, 150, and 160, via I/O protocols 132, 142, 152, and 162, respectively, and device adapters 134, 144, 154, and 164, respectively. I/O protocols 132, 142, 152, and 162, may comprise any sort of I/O protocol, including without limitation a fibre channel loop, FCoE (Fibre Channel over Ethernet), SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

By "data storage media," Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

In certain embodiments storage controller 120 is in communication with more than four data storage media. In certain embodiments, storage controller 120 is in communication with a plurality of storage arrays, wherein each storage array comprises a plurality of data storage media. In certain embodiments, one or more of the storage array as configured to use one or more RAID protocols Further in the illustrated embodiment of FIG. 1, storage controller 120 is in communication with host computer 102. As a general matter, host computer 102 comprises a computing device, such as a mainframe, personal computer, workstation, server, and combinations thereat including an operating system 107, such as and without limitation, WINDOWS, ISERIES OS, AIX, UNIX, MVS, LINUX, etc. (Windows is a registered trademark of Microsoft Corporation; iSeries and AIX are registered trademarks of IBM Corporation, and MVS is a trademark of IBM Corporation; Unix is a registered trademark licensed exclusively through The Open Group; and LINUX is a registered trademark of Linus Torvald). In certain embodiments, one or more of host computers 102, 104, and/or 106, further includes a storage management program. In certain embodiments, that storage management program may include the functionality of storage management type programs known in the art that manage the transfer of data to and from a data storage and retrieval system, such as for example and without limitation the IBM DFSMS implemented in the IBM MVS operating system.

In the illustrated embodiment of FIG. 1, host computer 102 comprises processor 103, host bus adapter 104, and computer readable medium 106. Further in the illustrated embodiment of FIG. 1, operating system 107, host bus adapter driver 191, and host bus adapter driver BIOS 193, are encoded in computer readable medium 106.

In the illustrated embodiment of FIG. 1, host bus adapter ("HBA") 104 comprises world-wide port number ("WWPN") 105, HBA BIOS 195, and HBA firmware 197.

In the illustrated embodiment of FIG. 1, host computer 102 is connected to fabric 110 utilizing HBA 104 ("HBA") and I/O protocol 116. I/O protocol 116 may be any type of I/O protocol; for example, a Fibre Channel ("FC") loop, a direct attachment to fabric 110 or one or more signal lines used by host computer 102 to transfer information to and from fabric 110. In the illustrated embodiment of FIG. 1, host computer 102 comprises one HBA and one communication link utilizing I/O protocol 116. In other embodiments, host computer 102 comprises a plurality of HBAs, wherein each HBA comprises an HBA BIOS and HBA firmware. In certain embodiments, the one physical communication link utilizing I/O protocol 116 comprises a plurality of individual communication paths interconnecting HBA 104 and fabric 110.

In the illustrated embodiment of FIG. 1, visual display device 108 and pointing device 109 are interconnected with host computer 102. As those skilled in the art will appreciate, host computer 102 may comprise other features, components, data input devices, and peripheral devices not shown in FIG. 1.

In certain embodiments, fabric 110 includes, for example, one or more FC switches 115. In certain embodiments, those one or more switches 115 comprise one or more conventional router switches. In the illustrated embodiment of FIG. 1, one or more switches 115 interconnect host computer 102 to storage controller 120 via I/O protocol 116. I/O protocol 116 may comprise any type of I/O interface, for example, a Fibre Channel, FCoE, Infiniband, Gigabit Ethernet, Ethernet, TCP/IP, iSCSI, SCSI I/O interface or one or more signal lines used by FC switch 115 to transfer information through to and from storage controller 120, and subsequently data storage media 130, 140, 150, and 160. In other embodiments, one or more host computers, such as for example and without limitation host computer 102 communicate directly with storage controller 120 using I/O protocol 116.

In the illustrated embodiment of FIG. 1, Applicants' storage controller 120 comprises processor 128, computer readable medium 121, microcode 122 written to computer readable medium 121, and host computer configuration 124 written to computer readable medium 121. Processor 128 utilizes microcode 122 to operate storage controller 120.

Storage controller 120 communicates with fabric 110 via I/O protocol 117 and host adapter 126. In the illustrated embodiment of FIG. 1, storage controller 120 comprises one host adapter and utilizes one communication link utilizing I/O protocol 117 to communicate with fabric 110. In other embodiments, storage controller 120 comprises a plurality of host adapters. In certain embodiments, the one physical communication link utilizing I/O protocol 117 comprises a plurality of individual communication paths interconnecting host adapter 126 and fabric 110.

Using prior art methods, configuring a data storage system, such as and without limitation data storage system 100, must be manually performed by a storage administrator. The storage administrator must collect world wide port numbers ("WWPNs") for each host bus adapter ("HBA") disposed in the host computer. This manual procedure generally varies by host computing device platform and HBA vendor. The system administrator must then set HBA BIOS settings and HBA firmware settings in accordance with the storage system vendor's Host Attachment Guide specifications. These settings vary by host computing device platform and HBA vendor, and change frequently.

The system administrator must then establish switch zoning on the switch that provides the desired connectivity to the data storage media, and install storage management software that can be used to create and modify host computer information 124 encoded in the storage controller 120. The system administrator must also collect information from the storage system user regarding certain desired logical configurations, such as logical unit ("LUN") sizes, numbers, and types.

The storage administrator must then ensure that either direct access to the storage controller or the hardware management console is available, or alternatively, ensure that an ethernet path exists to remotely access the storage controller or the hardware management console.

In the illustrated embodiment of FIG. 1, the storage administrator's computing device 180 is shown in communication with hardware management console 170 via an ethernet communication link 174 and ethernet port 172 disposed in hardware management console 170. Whether access is made via an ethernet communication link to storage controller 120, or to hardware management console 170, many storage system owners view such ethernet access as a security hole. In addition, storage controllers are often interconnected with networks not in communication with the administrator's computing device, thereby making system management difficult if not impossible.

Figure 2A:
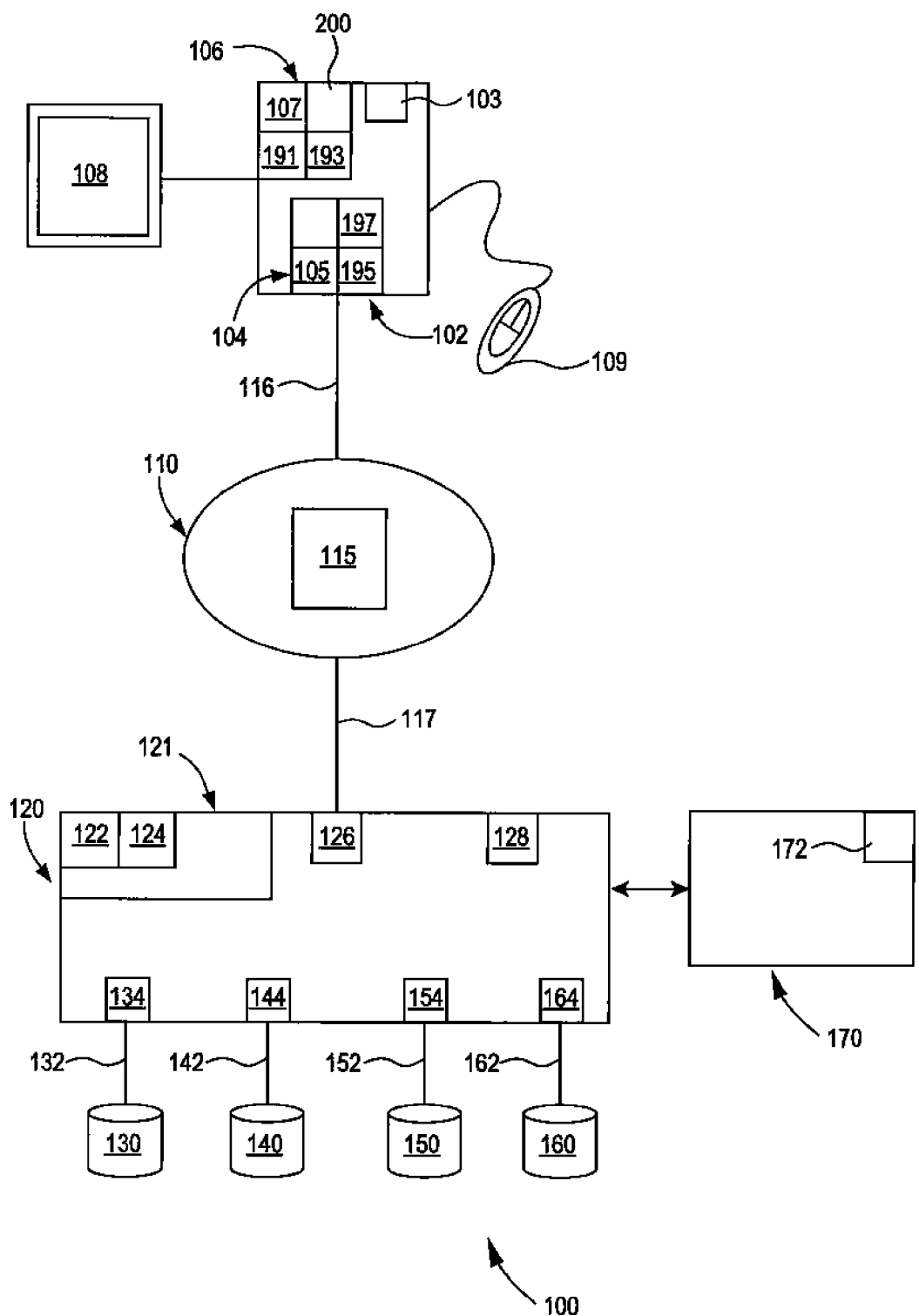
FIG. 2A is a block diagram showing Applicants' configuration algorithm encoded in a host computer disposed in the data storage system of FIG. 1.
Figure 2B:
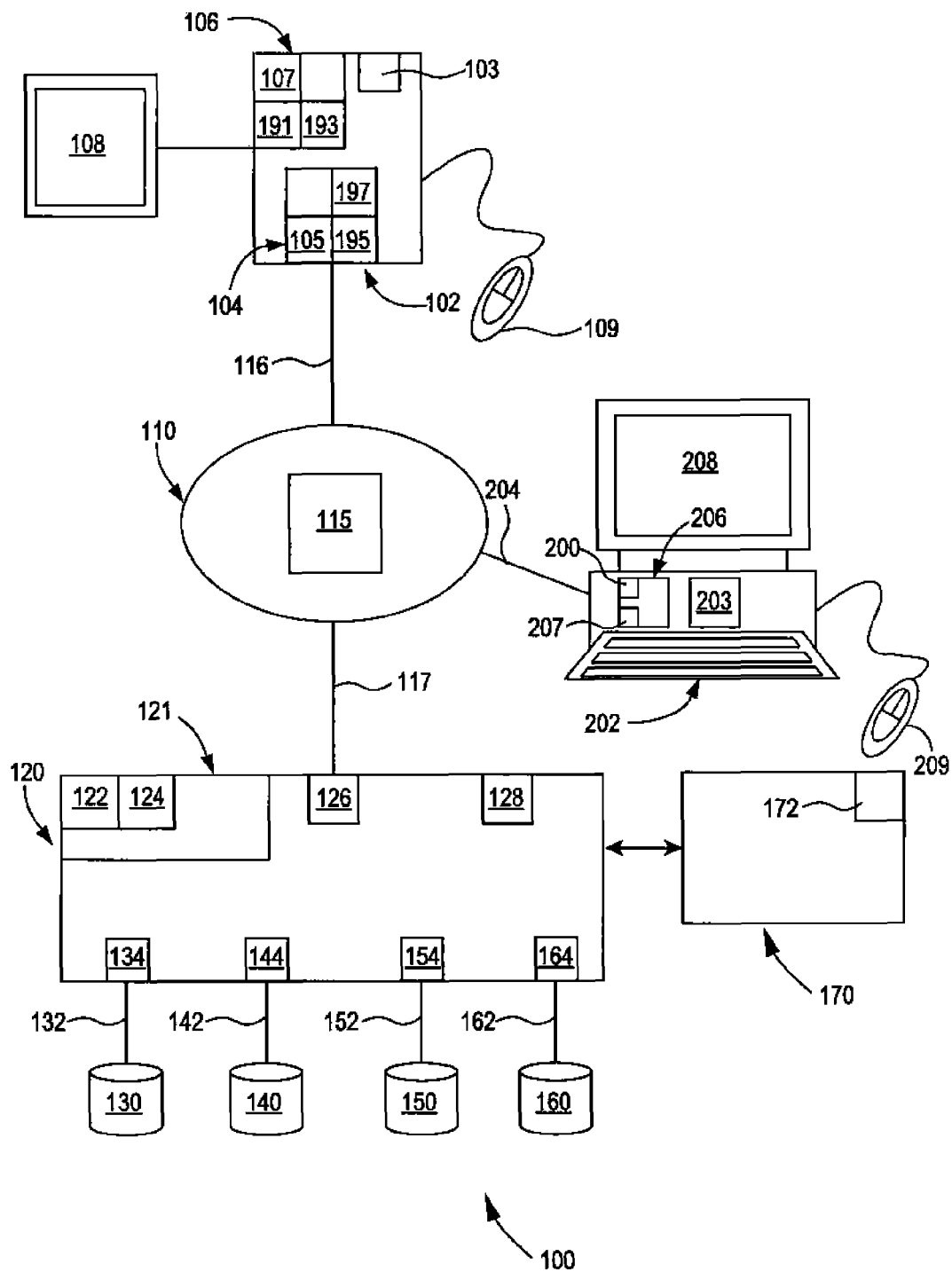
FIG. 2B is a block diagram showing Applicants' configuration algorithm encoded in a remote computing device in network communication with the data storage system of FIG. 1.

Applicants' invention comprises a computer-implemented configuration method for data storage systems, such as and without limitation data storage system 100 (FIGS. 1, 2A, 2B). In certain embodiments, Applicants' configuration method is encoded as a configuration algorithm, and is executed on a host computer in communication with a data storage system. For example in the illustrated embodiment of FIG. 2A, host computer 102 comprises the elements shown in FIG. 1, wherein Applicants' configuration algorithm is encoded in computer readable medium 106 as computer readable program code 200.

In certain embodiments, Applicants' configuration method is encoded as a configuration algorithm, is executed on a computing device that is remote to a host computer, wherein that remote computing device communicates with the host computer via a network, and wherein the remote computing device does not communicate via an ethernet communication link with either a storage controller, such as storage controller 120, or a hardware management console, such as hardware management console, 170. For example in the illustrated embodiment of FIG. 2B, remote computing device 202 communicates with fabric 110 via communication link 204. Remote computing device can communicate with host computer 102 via communication links 204 and 116, and with storage controller 120 via communication links 204 and 117.

In the illustrated embodiment of FIG. 2B, remote computing device 202 comprises processor 203, computer readable medium 206, visual display device 208, and pointing device 209. Applicants' computer readable program code 200 and operating system 207 are encoded in computer readable medium 206. As those skilled in the art will appreciate, remote computing device 202 may comprise other features, components, data input devices, and peripheral devices not shown in FIG. 2B.

Applicants' invention comprises a computer-implemented configuration method, wherein the method detects and identifies certain hardware, software, and firmware, disposed on a host computer, such as host computer 102, and wherein the method further prompts a user to select certain configuration options.

Applicants' invention further comprises computer readable program code, such as computer readable program code 200 (FIGS. 2A, 2B), encoded in a computer readable medium, such as for example computer readable medium 106 (FIG. 2A) or 206 (FIG. 2B), wherein that computer readable code is executed by a processor, such as processor 103 (FIG. 2A) or processor 203 (FIG. 2B), to perform one or more of the steps of Applicants' method as summarized in FIGS. 3 and 4. As a general matter, computer readable media 106 and 206 may comprise any computer readable medium, including for example and without limitation, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

In certain embodiments, Applicants computer readable program code comprises a code base encoding, inter alia, a plurality of interactable graphical objects, wherein a graphical user interface ("GUI") is generated and visually displayed when the code base is executed on a computing device interconnected to a visual display device, wherein the GUI comprises the plurality of interactable graphical objects and a pointer comprising a symbol, wherein a pointing device, such as pointing device 109 and/or 209, in communication with the computing device enables movement of the pointer such that by moving the pointer to, and activating, an interactable graphical object, a command can be executed or a new window can be opened.

FIGS. 3 and 4 summarize Applicants' method. Referring now to FIG. 3, in step 310 the method provides Applicants' computer readable program code encoding Applicants' configuration algorithm, and a storage system comprising a host computer, a storage controller, and a plurality of storage media.

In certain embodiments, step 310 further comprises updating Applicants' computer readable program code, such that the computer readable program code comprises the most recent changes, and the most recommended, hardware, software, and firmware, versions and settings, wherein those updates are received from a plurality of hardware, software, and firmware vendors, and wherein those updates are encoded in Applicants' computer readable program code. In certain embodiments, updated configuration information resides on a remote computer, and in step 310 the method retrieves that updated information from the remote computer automatically. In certain of these embodiments, if the remote computer is not available, then the method utilizes the latest updated local information.

Based upon the physical location of the administrator the method determines in step 315 if a network-based configuration algorithm will be used. If the method elects in step 315 to use a network-based configuration embodiment, then the method transitions from step 315 to step 320 wherein the method executes the computer program readable code of step 310 using a remote computing device, such as remote computing device 202 (FIG. 2B), in network communication with the host computer, such as host computer 102 (FIGS. 1, 2A, 2B), and the storage controller, such as storage controller 120 (FIGS. 1, 2A, 2B). of step 310. The method transitions from step 320 to step 330.

If the method does not elect in step 315 to use a network-based configuration embodiment, then the method transitions from step 315 to step 325 wherein the method executes the computer program readable code of step 310 on the host computer, such as host computer 102 (FIGS. 1, 2A, 2B) of step 310. The method transitions from step 325 to step 330.

In step 330, the method examines a host bus adapter ("HBA") BIOS and HBA firmware versions and settings disposed in each HBA disposed in the host computer of step 310. In step 335, the method determines if incorrect HBA BIOS or HBA firmware settings were detected in step 330. As those skilled in the art will appreciate, HBA BIOS settings, and HBA firmware settings, vary by host computing device and HBA vendor. In certain embodiments, Applicants' computer readable program code encoding Applicants' configuration algorithm was updated and upgraded in step 310 to comprise the most recent and most recommended HBA BIOS settings, and HBA firmware settings and versions.

In step 335, the method determines if incorrect HBA BIOS settings, and/or non-current firmware settings were detected. If the method determines in step 335 that incorrect HBA BIOS settings, and/or non-current firmware settings were detected, then the method transitions from step 335 to step 340 wherein the method determines if an autocorrect protocol is being used. In certain embodiments, step 340 comprises displaying a message on a visual display device, wherein that visual message queries the user whether to invoke use of an autocorrect embodiment, and receives a user response to that query.

If the method elects in step 340 to utilize an autocorrect protocol, then the method transitions from step 340 to step 345 wherein the method adjusts any incorrect HBA BIOS settings detected in step 330, and/or downloads and installs on the host computer updated HBA firmware settings. The method transitions from step 345 to step 360.

Alternatively, if the method elects in step 340 not to utilize an autocorrect protocol, then the method transitions from step 340 to step 350 wherein the method visually displays a message to review the most current Host Attachment Guide for recommended HBA BIOS settings and/or more current HBA firmware settings. The method transitions from step 350 to step 360 wherein the method examines one or more HBA driver BIOS settings and HBA driver firmware versions. In step 365, the method determines if supported levels for HBA driver BIOS settings and/or more current HBA driver firmware versions and settings, were detected.

If the method determines in step 365 that unsupported levels for HBA driver BIOS settings and/or more non-current HBA driver firmware versions and/or settings, were detected, then the method transitions from step 365 to step 370 wherein the method determines if an autocorrect protocol is being used. In certain embodiments, step 370 comprises displaying a message on a visual display device, wherein that visual message queries the user whether to invoke use of an autocorrect embodiment, and receives user input in response to that query.

If the method elects in step 370 to utilize an autocorrect protocol, then the method transitions from step 370 to step 380 wherein the method adjusts any unsupported HBA driver BIOS settings detected in step 360, adjusts any incorrect HBA driver firmware settings, and/or downloads and installs on the host computer updated HBA driver firmware versions. The method transitions from step 380 to step 410 (FIG. 4).

Alternatively, if the method elects in step 370 not to utilize an autocorrect protocol, then the method transitions from step 370 to step 390 wherein the method visually displays a message to consult a Host Systems Attachment Guide or a System Storage Interoperability Center for recommended HBA driver BIOS settings and/or more current HBA driver firmware versions and/or settings.

The method transitions from step 390 to step 410 (FIG. 4) wherein the method detects the world-wide port numbers ("WWPNs") assigned to each of the installed HBAs disposed in the host computer of step 310 (FIG. 3). In step 415, the method determines whether to automatically assign access to the storage media in communication with storage controller 120. In certain embodiments, step 415 comprises displaying a message on a visual display device, wherein that visual message queries the user whether to invoke use of an auto-assign embodiment for the storage media in communication with the storage controller of step 310 (FIG. 3), and receives user input in response to that query.

If the method elects in step 415 to utilize an auto-assign protocol regarding allowed access to each storage medium in communication with the storage controller of step 310 (FIG. 3), then the method transitions from step 415 to step 420 wherein the method assigns one or more storage media in communication with the storage controller of step 310 to all installed HBAs disposed in the host computer of step 310. The method transitions from step 420 to step 440.

Alternatively, if the method does not elect in step 415 to utilize a auto-assign protocol, then the method transitions from step 415 to step 425 wherein the method visually displays the WWPNs of the installed HBAs and queries the user to assign access with respect to each WWPN and each storage medium in communication with the storage controller of step 310.

In step 430, the method receives and saves the user input generated and entered in response to the query of step 425. In certain embodiments, step 430 comprises saving that user input in a computer readable medium, such as computer readable medium 106 (FIG. 1, 2A, 2B) and/or computer readable medium 206 (FIG. 2B), disposed in the computing device executing Applicants' computer readable program code of step 310 (FIG. 3).

In step 435, the method determines if the user elected to assign access to the storage media of step 310 (FIG. 3) to a plurality of HBAs. If the method determines in step 435 that the user did not assign access to the storage media of step 310 (FIG. 3) to a plurality of HBAs, then the method transitions from step 435 to step 450.

Alternatively, if the method determines in step 435 that the user did assign access to the storage media of step 310 (FIG. 3) to a plurality of HBAs, then the method transitions from step 435 to step 440 wherein the method displays a message on an interconnected visual display device reminding the user that a multi-pathing solution must be installed.

The method transitions from step 440 to step 450 wherein the method displays a message querying the user to select a number and sizes of logical units ("LUNs") to create. As those skilled in the art will appreciate, a logical unit may include part of the storage on a disk drive, the entire storage on a disk drive, the total storage on multiple drives in a disk array, or any combination thereof. In certain embodiments, step 450 further comprises querying the user to designate a type for each of those LUNs, such as for example a fixed-block or count key data ("CKD"), RAID protocol; a location for each LUN, such as for example extentpool1 or Rank 6, and other parameters such as for example volume name.

In step 455, the method receives and saves the user input generated and entered in response to the query of step 450. In certain embodiments, step 455 comprises saving that user input in a computer readable medium, such as computer readable medium 106 (FIG. 1, 2A, 2B) and/or computer readable medium 206 (FIG. 2B), disposed in the computing device executing Applicants' computer readable program code of step 310 (FIG. 3).

In step 460, the method visually displays a message prompting the user to select a unique identifier ("ID") and password. In step 465, the method receives and saves the user ID and password received in response to the query of step 460. In certain embodiments, step 465 comprises saving that user input in a computer readable medium, such as computer readable medium 106 (FIG. 1, 2A, 2B) and/or computer readable medium 206 (FIG. 2B), disposed in the computing device executing Applicants' computer readable program code of step 310 (FIG. 3).

In step 470, the method gathers without user prompting host computer platform information, such as and without limitation computing system vendor, operating system, version, and the like. This background information will be provided to a storage controller to create a host configuration 124 (FIG. 1) on that storage controller In step 480, the method creates a plurality of commands to create a physical configuration for the data storage system comprising the host computer of step 310, the storage controller of step 310, and the data storage media of step 310. Step 480 further comprises creating a plurality of commands to create a logical configuration for the data storage system comprising the host computer of step 310, the storage controller of step 310, and the data storage media of step 310.

In certain embodiments, one or more of the commands to create a physical configuration and/or one or more of the commands to create a logical configuration, comprise a command line interface ("CLI") in combination with a plurality of configuration commands.

As those skilled in the art will appreciate, unlike a button or menu item in a graphical user interface, a command line is typically self-documenting, stating exactly what configuration is to be established. A CLI can generally be considered as consisting of syntax and semantics. The syntax is the grammar that all commands must follow. In the case of operating systems (OS), MS-DOS and UNIX each define their own set of rules that all commands must follow. In the case of embedded systems, each vendor, such as Nortel, Juniper Networks or Cisco Systems, defines their own proprietary set of rules that all commands within their CLI conform to. These rules also dictate how a user navigates through the system of commands. The semantics define what sort of operations are possible, and on what sort of data these operations can be performed.

A simple CLI will display a prompt, accept a "command line" typed by the user terminated by the Enter key, then execute the specified command and provide textual display of results or error messages. Advanced CLIs will validate, interpret and parameter-expand the command line before executing the specified command, and optionally capture or redirect its output.

In certain embodiments, the command lines generated in step 480 are saved by assigning a character string or alias to represent the full physical/logical configuration command. In certain embodiments, several physical/logical configuration commands are grouped to perform a more complex sequence, thereby creating a single entity, called a command procedure or script which itself can be treated as a command.

In step 490, the host background information of step 470 in combination with a plurality of configuration commands of step 480, and/or one or more command procedures formed in step 480, are provided to the storage controller of step 310 (FIG. 3) via communication link 116 (FIGS. 1, 2A, 2B) in combination with communication link 117 (FIGS. 1, 2A, 2B). In certain embodiments, a plurality of configuration commands of step 480, and/or a command procedure formed in step 480, are provided to the storage controller of step 310 (FIG. 3) via communication link 204 (FIG. 2B) in combination with communication link 117 (FIGS. 1, 2A, 2B).

In certain embodiments, step 490 further comprises executing the one or more command procedures by the receiving storage controller to create a physical configuration and a logical configuration for the data storage system. In certain embodiments, a processor, such as processor 128 executes a physical command procedure and/or a logical command procedure generated by, and received from, Applicants' computer readable program code encoding Applicants' configuration algorithm.

In certain embodiments, individual steps recited in FIGS. 3 and 4 may be combined, eliminated, or reordered.

While the preferred embodiments of the present invention have been illustrated in detail, it should be apparent that modifications and adaptations to those embodiments may occur to one skilled in the art without departing from the scope of the present invention as set forth in the following claims.

We claim:

1. An automated method to configure a data storage system, comprising the steps of:
    supplying a data storage system comprising a host computer, a storage controller in communication with said host computer, and a plurality of data storage media in communication with said storage controller, wherein said host computer further comprises a host bus adapter ("HBO") BIOS and HBA firmware, a HBA driver BIOS and HBA driver firmware;
    providing a configuration algorithm encoded in a computer readable medium as computer readable program code;
    executing said computer readable program code;
    creating by said configuration algorithm a command procedure comprising a plurality of physical configuration commands to establish a physical configuration for said data storage system;
    creating by said configuration algorithm a command procedure comprising a plurality of logical configuration commands to establish a logical configuration for said data storage system;
    wherein the step to create by said configuration algorithm a command procedure comprising a plurality of physical configuration commands further comprises the steps of:
    examining by said configuration algorithm said HBA BIOS and said HBA firmware;
    determining by said configuration algorithm if incorrect settings were detected in said HBA BIOS and/or in said HBA firmware;
    if incorrect settings were detected in said HBA BIOS and/or in said HBA firmware, determining by said configuration algorithm if an auto-correct protocol is being used;
    if an auto-correct protocol is being used, adjusting by said configuration algorithm said detected incorrect HBA BIOS and/or in said HBA firmware settings;
    examining by said configuration algorithm said HBA driver BIOS and said HBA driver firmware;
    determining by said configuration algorithm if incorrect settings were detected in said HBA driver BIOS and/or in said HBA driver firmware;
    if incorrect settings were detected in said HBA driver BIOS and/or in said HBA driver firmware, determining by said configuration algorithm if an auto-correct protocol is being used;
    if an auto-correct protocol is being used, adjusting by said configuration algorithm said detected incorrect HBA driver BIOS and/or in said incorrect HBA driver firmware settings.

2. The method of claim 1, wherein said executing step further comprises the step of executing said computer readable program code by said host computer.

3. The method of claim 1, wherein said executing step further comprises the steps of:
    supplying a network in communication with said host computer;
    supplying a computing device in communication with said network;
    executing said computer readable program code by said computing device.

4. The method of claim 1, wherein if an auto-correct protocol is not being used, said method further comprises the step of displaying by said configuration algorithm a message on a visual display device directing a user to a Host Attachment Guide for correct HBA BIOS and/or correct HBA firmware settings.

5. The method of claim 1, wherein if an auto-correct protocol is not being used, said method further comprises the step of displaying by said configuration algorithm a message on a visual display device directing a user to a Storage Interoperability Center for correct HBA driver BIOS and/or correct HBA driver firmware settings.

6. The method of claim 1, wherein the step to create by said configuration algorithm a command procedure comprising a plurality of physical configuration commands further comprises the steps of:
    detecting by said configuration algorithm one or more WWPNs assigned to said host bus adapter;

determining by said configuration algorithm whether to automatically assign access rights for said plurality of data storage media;

if automatically assigning access rights for said plurality of data storage media, assigning by said configuration algorithm access rights to each of said one or more for each of said plurality of data storage media;

if not automatically assigning access rights for said plurality of data storage media;

displaying by said configuration algorithm said one or more WWPNs on a visual display device;

saving by said configuration algorithm user input regarding access rights for each WWPN with respect to each of said plurality of data storage media.

7. The method of claim 6, wherein the step to create by said configuration algorithm a command procedure comprising a plurality of physical configuration commands further comprises the steps of:

determining and saving by said configuration algorithm host computer platform information;

displaying by said configuration algorithm on a visual display device a prompt requesting a unique identifier and a password; and receiving and saving by said configuration algorithm user input regarding a unique identifier and password.

8. The method of claim 1, wherein the step to create by said configuration algorithm a command procedure comprising a plurality of logical configuration commands further comprises the steps of:

displaying by said configuration algorithm a message to prompt a user to indicate a number of logical units required, a size for each logical unit, and a type for each logical unit;

receiving and saving by said configuration algorithm user input comprising a number of logical units required, a size for each logical unit, and a type for each logical unit.

9. A computer program product encoded in a computer readable medium wherein said computer program product is executed by a computer processor to configure a data storage system comprising a host computer, a storage controller in communication with said host computer, and a plurality of data storage media in communication with said storage controller, wherein said host computer further comprises a host bus adapter ("HBA") BIOS, HBA firmware, a HBA driver BIOS and HBA driver firmware, comprising:

computer readable program code which causes said programmable computer processor to create and save a physical command procedure comprising a plurality of physical configuration commands to establish a physical configuration for said data storage system;

computer readable program code which causes said programmable computer processor to create and save a logical command procedure comprising a plurality of logical configuration commands to establish a logical configuration for said data storage system;

wherein the computer readable program code which causes said programmable computer processor to create by said configuration algorithm a command procedure comprising a plurality of physical configuration commands further comprises:

computer readable program code which causes said programmable computer processor to examine by said configuration algorithm said HBA BIOS and said HBA firmware;

computer readable program code which causes said programmable computer processor to determine by said configuration algorithm if incorrect settings were detected in said HBA BIOS and/or in said HBA firmware;

computer readable program code which, if incorrect settings were detected in said HBA BIOS and/or in said HBA firmware, causes said programmable computer processor to determine by said configuration algorithm if an auto-correct protocol is being used;

computer readable program code which, if an auto-correct protocol is being used, causes said programmable computer processor to adjust by said configuration algorithm said detected incorrect HBA BIOS and/or in said HBA firmware settings;

computer readable program code which causes said programmable computer processor to examine by said configuration algorithm said HBA driver BIOS and said HBA driver firmware;

computer readable program code which causes said programmable computer processor to determine by said configuration algorithm if incorrect settings were detected in said HBA driver BIOS and/or in said HBA driver firmware;

computer readable program code which, if incorrect settings were detected in said HBA driver BIOS and/or in said HBA driver firmware, causes said programmable computer processor to determine by said configuration algorithm if an auto-correct protocol is being used;

computer readable program code which, if an auto-correct protocol is being used, causes said programmable computer processor to adjust by said configuration algorithm said detected incorrect HBA driver BIOS and/or in said incorrect HBA driver firmware settings.

10. The computer program product of claim 9, wherein said programmable computer processor is disposed in said host computer.

11. The computer program product of claim 9, wherein said host computer is in communication with a network, and wherein said programmable computer processor is disposed in a computing device in communication with said network.

12. The computer program product of claim 9, wherein if an auto-correct protocol is not being used, further comprising computer readable program code which causes said programmable computer processor to display a message on a visual display device directing a user to a Host Attachment Guide for correct HBA BIOS and/or correct HBA firmware settings.

13. The computer program product of claim 9, wherein if an auto-correct protocol is not being used, further comprising computer readable program code which causes said programmable computer processor to display a message on a visual display device a message directing a user to a Storage Interoperability Center for correct HBA driver BIOS and/or correct HBA driver firmware settings.

14. The computer program product of claim 9, the computer readable program code which causes said programmable computer processor to create a command procedure comprising a plurality of physical configuration commands further comprises:

computer readable program code which causes said programmable computer processor to detect one or more WWPNs assigned to said host bus adapter;

computer readable program code which causes said programmable computer processor to determine whether to automatically assign access rights for said plurality of data storage media;

computer readable program code which, if automatically assigning access rights for said plurality of data storage media, causes said programmable computer processor to assign access rights to each of said one or more WWPNs for each of said plurality of data storage media;

computer readable program code which, if not automatically assigning access rights for said plurality of data storage media causes said programmable computer processor to:

display said one or more WWPNs on a visual display device; and save user input regarding access rights for each WWPN with respect to each of said plurality of data storage media.

15. The computer program product of claim 14, wherein the computer readable program code which causes said programmable computer processor to create a command procedure comprising a plurality of physical configuration commands further comprises:

computer readable program code which causes said programmable computer processor to determine and save host computer platform information; computer readable program code which causes said programmable computer processor to display on a visual display device a prompt requesting a unique identifier and a password; and computer readable program code which causes said programmable computer processor to receive and save user input regarding a unique identifier and password.

16. The computer program product of claim 9, wherein the computer readable program code which causes said programmable computer processor to create a command procedure comprising a plurality of logical configuration commands further comprises:

computer readable program code which causes said programmable computer processor to display a message to prompt a user to indicate a number of logical units required, a size for each logical unit, and a type for each logical unit;

computer readable program code which causes said programmable computer processor to receive and save user input comprising a number of logical units required, a size for each logical unit, and a type for each logical unit.

* * * * *